United States Patent [19]

Winegeart

[11] Patent Number: 4,577,830
[45] Date of Patent: Mar. 25, 1986

[54] HIGH PRESSURE BALL VALVE WITH AN INTERFERENCE FIT CLOSURE SEAL

[76] Inventor: Mitchel E. Winegeart, 4512 Hessmer Ave., Metairie, La. 70002

[21] Appl. No.: 770,621

[22] Filed: Aug. 27, 1985

[51] Int. Cl.⁴ ............................................. F16K 25/00
[52] U.S. Cl. .................................... 251/84; 251/163; 251/291
[58] Field of Search ................... 251/84, 162, 163, 291

[56] References Cited
U.S. PATENT DOCUMENTS

| | | | |
|---|---|---|---|
| 2,438,776 | 3/1948 | Boylan | 251/291 X |
| 2,820,605 | 1/1958 | Dougherty | 251/163 |
| 3,192,945 | 7/1965 | Blakeley | 251/84 X |
| 3,827,671 | 8/1974 | Bolden | 251/84 |

Primary Examiner—Harold W. Weakley
Attorney, Agent, or Firm—Pravel, Gambrell, Hewitt & Kimball

[57] ABSTRACT

A high pressure free floating ball valve wherein a pair of operating stems interconnect with slots on the hall to allow relative movement there between.

18 Claims, 8 Drawing Figures

HIGH PRESSURE BALL VALVE WITH AN INTERFERENCE FIT CLOSURE SEAL

BACKGROUND OF THE INVENTION

The present invention relates to an improved interference fit free floating ball valve for use in high pressure, high temperature environments, and more particularly, to an improved ball type valve wherein a pair of operating stems interconnect with slots on the ball valving member, to allow relative movement between the stems and the ball as the valve is moved between open and closed positions. The preferably extend externally of the housing so that the valve ball can be operated by either stem. A valve housing supports the free floating ball valving member therein, with each stem engaging a slot of the ball so that rotation of either stem rotates the valve. The stems and slots are sized so that an interference fit between the ball and the valve downstream floating seat is formed in the closed flow position. In the open position, a loose file allows field disassembly of the bonnet, stems and ball portions. The two stems are mounted within the housing on a common axis. A flexible annular guard skal prevents corrosion and erosion of the stem-to-ball connections.

Valves are often used in situations where high pressures, high temperatures or like severe conditions require a very tight or "interference" fit in which the valve closure member is biased into a force fit contact with a seat portion of the valve to thereby prevent leakage between the valve member and the valve body upon closure. This type of valve has particular utility, for example, in the geothermal and oil well industries.

The biasing of a valving member into an engaged "interference fit" position with a valve body (and more specifically with the valve seat of the body) is a broad concept which has been discussed in a number of U.S. patents. Notice, for example, U.S. Pat. Nos. 3,712,584 entitled "Valve and Method of Making Same" issued to Eugene Wise and Homer Galt. In that patent, a ball valving member is rotatably mounted within a valve body having inlet and outlet passages. The valve body is provided with one or more raised portions on its interior surface which serve to firmly engage or bias the valve member when it is rotated to the closed position, thereby preventing leakage between the valve member and the valve body during operation. In the manufacture of such a valve in accordance with the Wise et al patent, the body is formed of a suitable plastic material and is molded about the valve member. The valve member is placed in an open position in the mold and is provided with one or more recessed portions on the outer surface thereof so that complementary raised portions are formed on the inner surface of the molded valve body which serve to firmly engage or bias the valve member when it is rotated to a closed position. Unlike the present invention, a single stem rather than two stems is provided in Tirse et al. Further, Wise et al. does not have the free floating ball, operable by the stems which engage slots on the ball, allowing relative movement between the ball and stems. Further the flexible guard seal to protect the stem-to-ball connection is not seen.

Another ball valve having an interference fit or wedgeball member is the Behle et al. patent, U.S. Pat. No. 4,440,380. In the Behle patent, at least one ball valve segment is located within a partial valve cage mounted within a tank. The cage is integral with a valve housing removably mounted within a tank mounted flange. The housing includes an inclined sealing surface which the ball valve segment engages in closed position. A lading outlet chamber is located below the inclined seating surface. An operating shaft is inclined with respect to the outlet chamber. Inclined openings are provided in the valve housing and in the outlet chamber through which the operating shaft passes. The valve uses not two but one operating shaft that includes and eccentric head which is located within a non-round slot in the ball valve segment. Rotation of the operating shaft rotates the eccentric head which drives the valve segment between open and closed positions. Preferably a pair of ball valve segments located approximately 180° apart are connected with supports or ribs. The valve segment which closes the opening into the discharge chamber is larger. The contour of the eccentric head is such that the smaller valve segment is located outwardly from the center of the discharge opening in the valve housing when the larger valve segment is in open position to minimize flow restriction. The smaller valve segment is cam shaped to urge the larger portion into closed and sealed position. This device doesn't use the dual stem, interference fit ball valve of the present invention using a free floating ball valve operable by either stem. Further, the housing and bonnet carrying separate stems which affords easy disassembly and easy access to the ball is not shown.

A ball type valve having a wedge or interference type fit can be seen in the patent to Graham, U.S. Pat. No. 3,941,351. Graham U.S. Pat. No. 3,941,351 patent shows a single stem that operates an otherwise free floating ball. The ball has an integrally attached hub that freely rotates within a circular recess of the valve body. The valve is closed by a quarter (¼) turn rotation of the ball. A single stem or toggle purportedly serves a dual function of closing the ball and pressure sealing the ball after the ball is closed. The stem includes a lower end that fits into a matching groove on the core or ball valving member. A cam disc and sleeve cooperate with the stem or toggle to pivot the stem or toggle about an axis parallel to the targeted axis of the core or ball valving member in order to force the core or ball valving member against the valve seat. Graham differs from the present invention because only a single stem is used by Graham. In the present invention, two aligned stems are mounted for rotation in the valve body and these two stems each transmit load between the valve body and the free floating ball to produce an interference or force fit of the ball against a valve seat. An annular flexible seal protect the stem-to-ball connection.

A high pressure ball valve manufactured by W.K.M. Division, ACF Industries, Inc., P.O. Box 4334, Houston, Tex. 77210, is sold under the designation Dyna Seal 360 (API2000-5000 psi) and Dyna Seal 370 (Class 600-2500 psi). The Dyna Seal valve is high pressure ball valve using a one piece body with annular open top through which a ball and stem one piece assembly can be inserted. The Dyna Seal valve includes a bonnet that can be unbolted and removed. The one piece ball-stem-trunnion can then be pulled clear of the valve seats through the top of the valve body, permitting seat replacement. The Dyna Seal valve utilizes floating one piece metal seats with locked in place non-metallic face seals. In Dyna Seal valve, in order to obtain a seal at low pressure, a series of wave springs force the seats against the ball. However, at higher line pressures the upstream seat is forced against the ball by the pressure working across the differential area on the seat. Force from the springs becomes insignificant at these higher pressure ranges. The Dyna Seal 360, 370 class W.K.M. valves differ from the present invention because they do not show the free floating ball construction of the present invention which is operated by stems which are separate from the ball valving member. Rather, the W.K.M. Dyna Seal uses a one piece stem and ball assembly that does not permit relative movement between the ball and the two stems as is the case of the present invention. Further, the W.K.M. Dyna Seal valve does not produce an interference fit when the valve is rotated to a closed position by producing a change in relative movement between the stems and the ball between such open flow to closed flow positions. Further, the Dyna Seal valve does not have the flexible annular seal which conforms to the upstream upside of the ball valving member and flexes with it during operation to prevent corrosion of the stem-to-ball connection. Another problem with the W.K.M. Dyna Seal high pressure valve is that the integral ball and stem construction does not provide a free floating ball so that pressure can not be used to force the ball against the downstream seat in the closed position. While the W.K.M. high pressure Dyna Seal valve is a top entry valve, the ball is held in position with a series of wafer springs which require special tools to remove both seats from contact with the ball so that the ball can be removed for servicing. With the present invention, in line repairs can be quickly made with conventional tools such as socket wrenches. Since the interference fit is relieved when the valve is opened, the ball can be simply lifted from the housing (after the bonnet is disassembled) with a screw driver or the like. Thus, the present invention is a paragon of simplicity, having minimal parts, and corresponding ease of repair and maintenance.

W.K.M. Division, AFC Industries, Inc., also manufactures a 150 psi and 300 psi class ball valve under the designation "Dyna Seal 370" which uses a single stem operating ball valve. The stem-to-ball connection includes the use of a rectangular drive portion of the stem which interconnects with a slot on the ball valve. The Dyna Seal 370 valve differs from the present invention because a single rather than a dual stem construction is shown. Further, with the W.K.M. Dyna Seal 370, an interference fit is not produced on the downstream seat of the valve which is produced by load transferred through both stems from the valve body to the valving member and to the valve seat. Further, the W.K.M. 370 series valve does not use the flexible guard on the upstream side of the ball valving member to protect the stem-to-ball connections.

Both of the above discussed W.K.M. Dyna Seal valves use flanged ends which respectively have inlets and outlets and a longitudinal cylindrical bore with a linear central axis. However, the 150 and 300 class Dyna Seal 370 uses a two part valve housing unlike the single piece body or housing of the present invention with a bonnet wherein the housing carries one stem and the bonnet carries a separate stem, both of which are separate and moveable with respect to the ball valving member. This two part valve requires removal of the entire valve for repair, as in line repairs are not possible.

GENERAL DESCRIPTION OF THE PRESENT INVENTION

The present invention provides an improved ball valve having an interference fit closure capability which perfects a force fit or interference fit between the ball valving member and the downstream seat portion of the valve upon closure of the valve. The improved valve includes a valve housing having an inlet and an outlet which are connected by a flow bore which is generally cylindrical and has a straight linear central axis through the valve body. The valve housing includes an upper open portion which is closed by a valve bonnet during operation. Both the housing and the bonnet carry operating stems which interconnect with the ball valving member, so that the ball valving member can be rotated by either stem. However, the ball valving member is free floating so that it can move with repsect to the stems and the housing as well as the seat. The ball valving member has a flow opening and is mounted for rotation within the valve between open and closed flow positions. The flow opening is preferably cylindrical having a corresponding diameter and area to the flow bore of the valve housing. The ball valving member carries a pair of transverse slots which are formed on generally opposite surfaces of the ball valving member above and below the flow opening respectively.

During operation the slots are respectively positioned adjacent to the two stems and in fact the stems engage the slots so that rotation of the stems perfects a rotation of the ball valving member. The first stem is rotatably mounted in the housing generally opposite the removable valve bonnet and upon an axis of rotation that is transverse with respect to the flow bore axis. The stem includes an end portion that is generally rectangular and engages one of the rectangular slots of the ball. The rectangular end portion of the stem and the transverse rectangular slot of the ball are correspondingly sized to interconnect and fit together. The second valve stem is rotatably mounted in the removable valve bonnet and upon an axis of rotation that is transverse with respect to the flow bore axis, and includes an end portion that engages one of the slots of the ball so that the stem and the ball are connected together for rotation. It should be understood however, that the stems and the valve ball are separate parts which can move with respect to each other as the ball is moved between open flow and closed flow positions. This feature allows an interference fit to be made between the ball valve member and the downstream seat which carried by the housing. When the ball valving member is rotated into an open position, the interference fit is relieved allowing easy disassembly of the valve without stresses associated with the interference fit holding the ball valve in position. The stems and slots cooperate to cam the ball valve member in to the interference fit with the downstream seat responsive to rotation by either stem and rotation of the ball valving member from the open to the closed position. In the preferred embodiment, the stems rotate upon a common axis of rotation. Each of the stems is mounted upon bearings such as for example, roller bearings which form a load carrying interface between the stems and the valve housing. Thus, the stems and bearings carry load between the ball valving member and the housing so that a good structural interference fit can be made between the housing and the ball valving member.

In the preferred embodiment, a flexible annular guard seal is provided at the interface of the ball valving member and the valve body on the upstream side of the ball valving member. THe seal functions as a guard to prevent travel of particulate material such as sand from the valve bore to body cavity and the stems. Thus, the annular seal aids in preventing the travel of sand, grit, or other undesirable solid matter from entering the working mechanism of the valve. Ordinarily such undesirable particulate matter can cause corrosion and/or mechanical erosion of the stem-to-ball connection.

DETAILED DESCRIPTION OF THE PREFERRED EMBODIMENT

FIGS. 1, 3, 4 and 8 show generally the preferred embodiment of the apparatus of the present invention designated jointly by the numeral 10.

Figure 1:
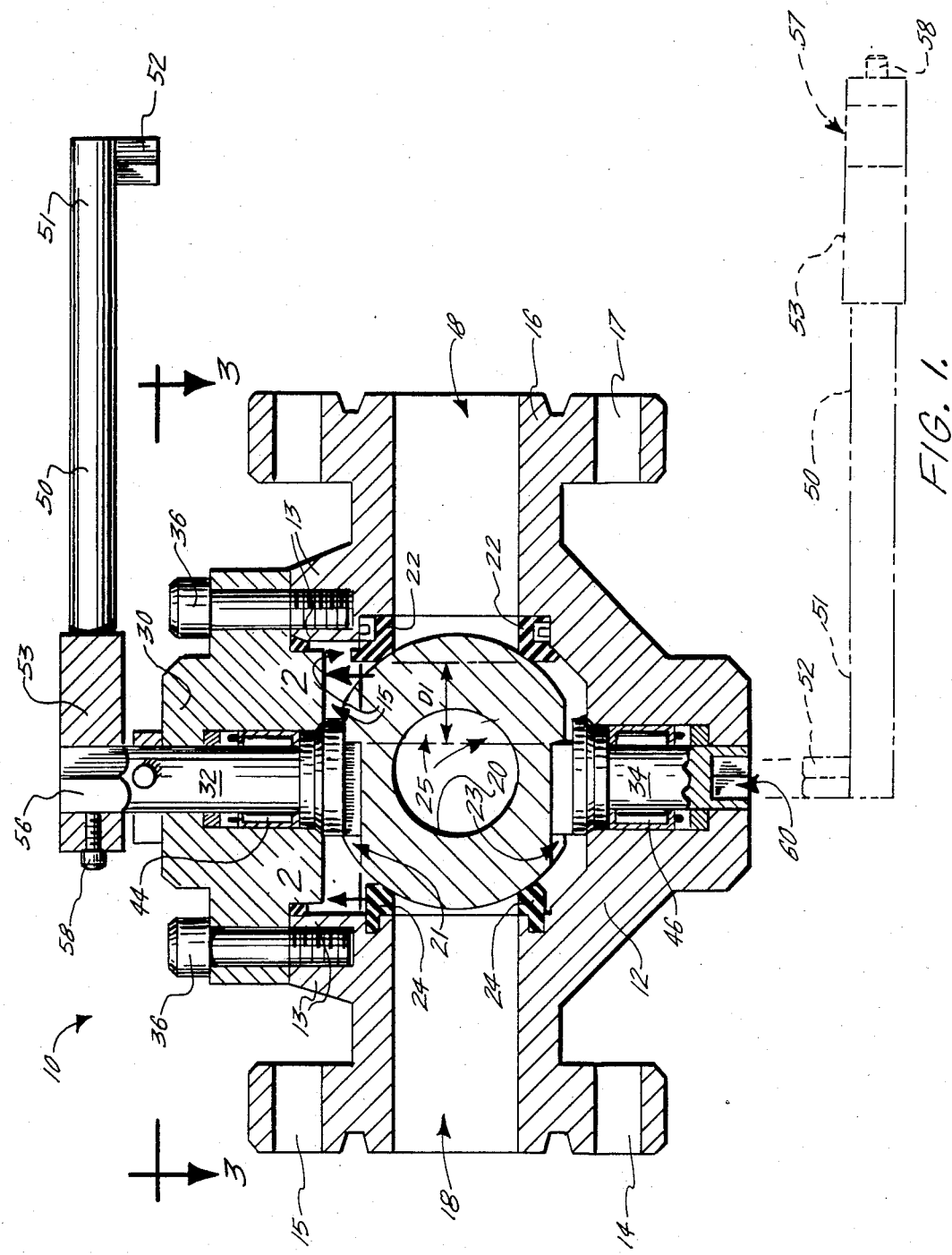
FIG. 1 is a sectional helovational view of the preferred embodiment of the apparatus of the present invention.
Figure 2:
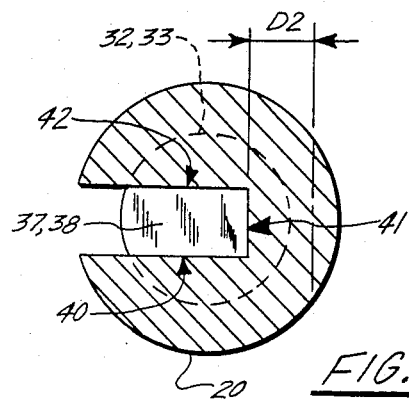
FIG. 2 is a sectional view taken along lines 2—2 FIG. 1.
Figure 3:
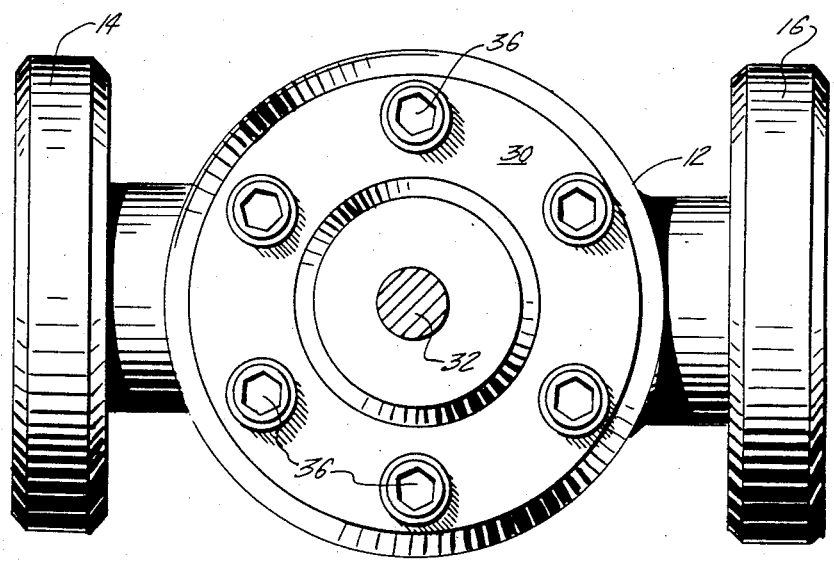
FIG. 3 is a top view of the preferred embodiment of the apparatus of the present invention taken along lines 3—3 of FIG. 1.

Valve 10 includes an overall valve body 12 having a removable bonnet 30 portion which is bolted to the body as shown in FIG. 1. Body 12 includes a pair of upstream and downstream flanges 14, 16 each having respectively a bolt circle 15 which allows the valve to be bolted into a pipeline for example. The use of such flanges, such as ring type joint flanges is known in the art.

Body 12 includes a cylindrical linear bore 18 having an inlet or upstream portion at flange 14 and an outlet at flange 16. Bore 18 is preferably of uniform diameter and is cylindrical thus, having a straight linear central axis.

Figure 4:
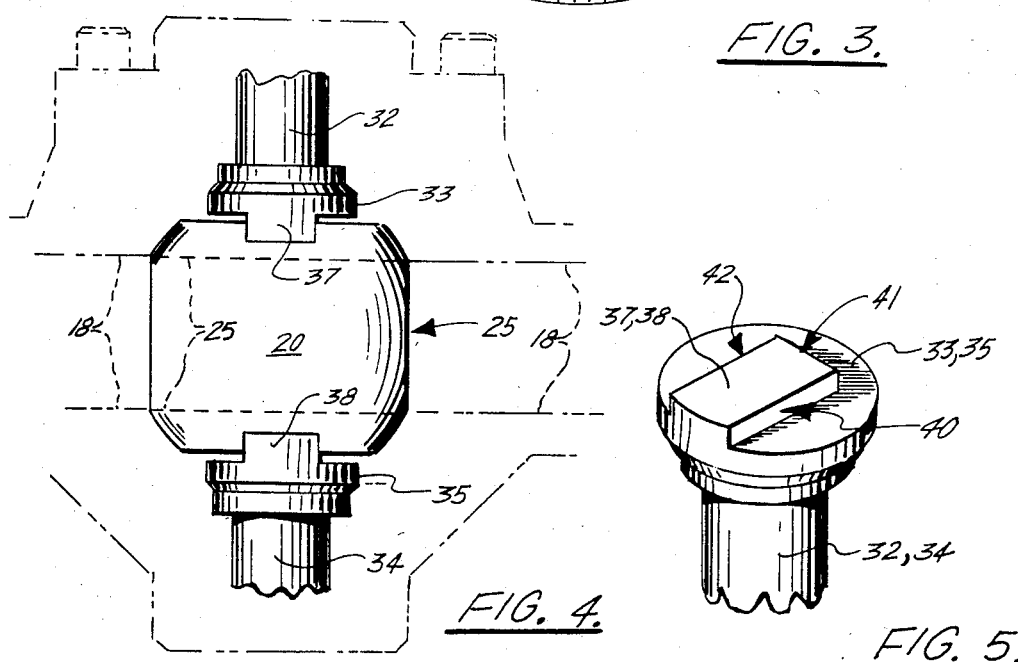
FIG. 4, is a partial fragmentary view of the preferred embodiment of the apparatus of the present invention illustrating the ball valving and stem portions when the valve is an open flow position.
Figure 5:
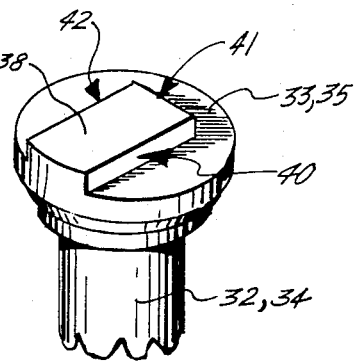
FIG. 5, is a partial perspective view of one of the valve stems illustrating the rectangular drive portion thereof.
Figure 6:
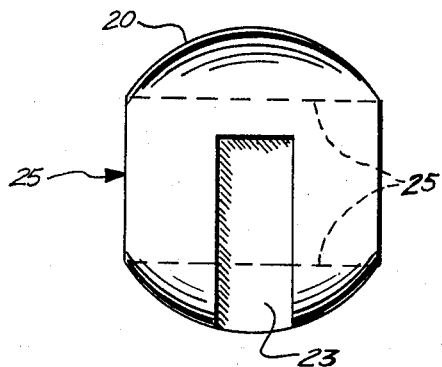
FIG. 6, is a bottom view of the ball valving member.
Figure 8:
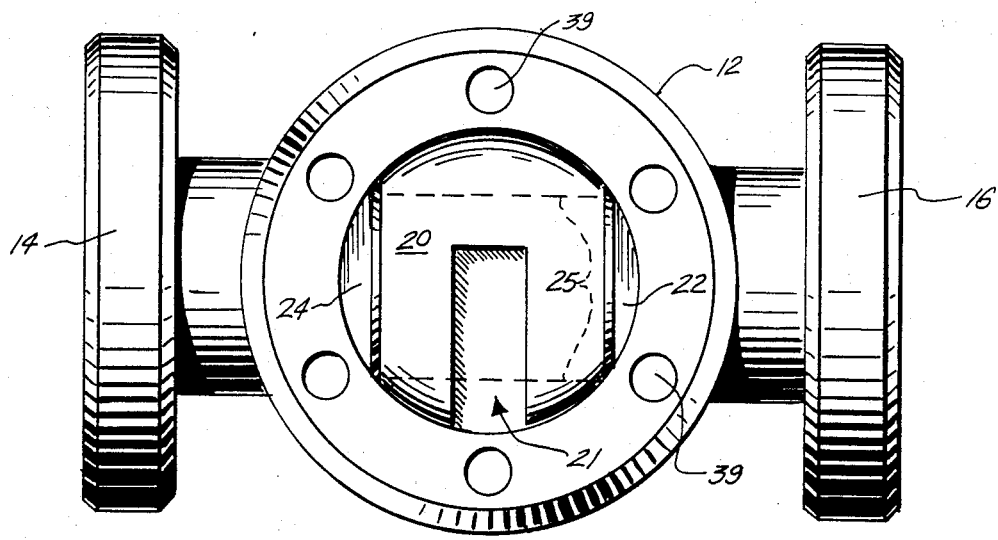
FIG. 8, is a top view of the preferred embodiment of the apparatus of the present invention showing the bonnet removed to expose the ball valving member.

A ball valving member 20 (see FIGS. 2, 4, 6 and 8) is rotatably mounted within housing 12. Ball valving member 20 has a central longitudinal cylindrical flow opening 25 preferably of constant uniform diameter. The dotted lines in FIGS. 6 and 8 show the flow opening through ball valving member 20. Ball valving member 20 is mounted within the valve body 12 between open and closed flow positions. The ball 20 includes a pair of transverse slots 21, 23 formed on generally opposite surfaces of ball 20 above and below flow opening 25 respectively as can best seen in FIGS. 1, 4, 6 and 8. Each slot, 21, 23 is generally rectangular and correspondingly sized to engage with a stem 32, 34 as will be described here more fully hereinafter. Each stem 32, 34 can interconnect with the slots 21, 23 respectively so that a rotation of either stem 32, 34 can produce a corresponding correlation of ball valving member 25. Stem 32 is rotatably mounted within bonnet 30, while stem 34 is rotatably mounted within main housing 12. Ball valving member is mounted within housing 12 and in communication with bore 18 so that in an open position (FIG. 4) the flow opening 25 of ball 20 and the bore 18 of housing 12 align to form a substantially continuous uninterrupted flow passage of constant uniform diameter as shown in FIG. 4 of the drawings.

An annular opening 15 is formed in the top of housing 12 so that ball 20 can be removed from housing 12. Thus, opening 15 would have a diameter greater than the overall diameter of ball valving member 20. Notice for example the top view of FIG. 8 which shows housing 12 and its flanges 14, 16 with bonnet 30 removed. Notice that the ball 20 could be removed by pulling it upwardly. The top rectangular slot 21 is shown in FIG. 8. A similarly correspondingly sized slot 23 is provided on the bottom of ball 20 as shown in FIG. 6.

Figure 7:
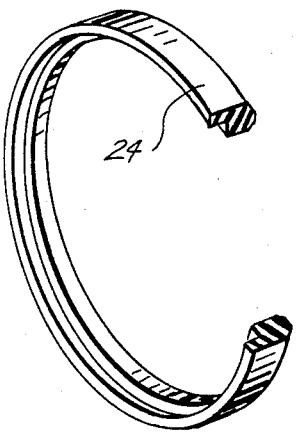
FIG. 7, is a perspective fragmentary view of the upstream seal portion of the preferred embodiment of the apparatus of the present invention.

A downstream annular seat 22, is mounted upon body 12. Seat 22 is a free floating seat which can move with respect to ball 20. An upstream annular seal 24 (FIG. 7) is provided. Seal 24 is a sand seal which prevents particulate material from moving from bore 18 into the annular space 15 defined by the opening which allows ball 20 to be removed from housing 12. Space 15 communicates with both stems 32, 34. Thus, annular seal 24 functions as a guard to prevent particulate matter, sand and the like from entering the space 15 or cavity so that it can come in contact with the lower most portions of the stems 32, 34. Annular seal 24 would be manufactured of a flexible yet chemically resistant material such as Viton. During use, the seal 24 would be deformed or displaced some what so that it presses tightly against the ball 20. However, since the seal 24 is flexible, it can displace further or be squeezed as the ball 20 is removed from the housing when the bonnet 30 is removed.

Bonnet 30 is connected to housing 12 by means of bolted connection 36. A plurality of bolts are threadably attached to housing 12 at annular top 13. A plurality of threaded openings 39 are provided on body 12 at annular top 13 which are receptive of bolts 36.

Each stem 32, 34 is mounted for rotation and also functions to transfer load from either bonnet 30 or housing 12 to seat 22. Each stem 32, 34 is surrounded by bearings 44, 46. Bearings 44, 46 can be for example, trunnions, pin bearings, roller bearings or the like. Suitable packing, such as Chevron packing or poly-packing would be used to prevent leakage between stems 32, 34 and bonnet 30 or housing 12 respectively.

Each stem 32, 34 extends externally of the housing 12 and of bonnet 30. Thus, stem 32 provides an upper squared end 56 which receptive of handle 50 having an end portion 53 with an opening that is correspondingly sized to fit over stem upper 56. A said screw 58 would perfect a tight fit between handle 50 and stem end 56. As shown in FIG. 1, handle 50 can also be used to rotate stem 34. Stem 34 provides a square recess 60 receptive of a similarly sized projection 52 provided on the opposite end portion 51 of handle 50 from end portion 53. In FIG. 1, the handle 50 is shown in phantom lines with projection 52 shown prior to insertion in recess 60. Thus, the present invention provides a valve which can be operated from two stems to open and close the valve. This is of particular utility in manifold use where several valves, pipe and flanges are bolted or connected by welding in a tight arrangement which can present problems in opening or closing a valve from a particular side.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limited sense.

I claim:

1. A valve comprising:
   a. a valve housing having inlet and outlet portions connected by a flow bore with a straight linear central axis;
   b. a ball valving member having a flow opening and being mounted for rotation within the valve body between open and closed flow position;
   c. a pair of transverse slots formed on generally opposite surfaces of the ball valving member, above and below the flow opening respectively;
   d. a removable valve bonnet forming a portion of the valve housing;
   e. a first valve stem rotatably mounted in the housing generally opposite the removable valve bonnet and upon an axis of rotation that is transverse with respect to the flow bore axis, and including an end portion that engages one of the slots of the ball so that the first valve stem rotates and the ball are connected together for rotation;
   f. a second valve stem rotatably mounted in the removable valve bonnet and upon an axis of rotation that is transverse with respect to the flow bore axis and including an end portion that engages one of the slots of the ball so that the stem and the ball are connected together for rotation;
   g. a valve seat on the valve body for forming a closure to the flow bore with the ball valving member; and
   h. cam means, responsive to rotating at least one of the stems and the connected ball valving member to the closed position, for producing an interference fit between the ball valving member and the valve body at the seat, wherein load is transferred between the valve body including the bonnet and seat through both of the stems.

2. The valve of claim 1 wherein the stems can move within the slots as the valve opens and closes.

3. The valve of claim 1, wherein the stems rotate upon a common axis of rotation.

4. The valve of claim 1, wherein the slots are generally rectangular slots having one end portion that is closed.

5. The valve of claim 1, wherein each stem carries a rectangular drive end portion which respectively engages a rectangular slot of the ball valving member.

6. The valve of claim 5, wherein the cam means includes at least in part, the drive portions of the stems and the slots on the ball valving member and the drive end portions of the stems transfer load to the ball valving member in the closed position to force fit the ball valving member against the seat.

7. The valve of claim 1, wherein the slots on the ball valving member include at least two angularly positioned bearing surfaces which are engaged respectively by the stems to close and to open the valve.

8. The valve of claim 7, wherein the cam means includes one of the bearing surfaces of each slot which is a load bearing surface that transmits an interference fit loading to the ball valving member in the closed position.

9. The valve of claim 3, wherein the flow bore axis and stem common axis perpendicularly intersect.

10. The valve of claim 1, wherein either stem can rotate to open or close the ball valving member.

11. The valve of claim 1, wherein the flow bore and valve member opening are cylindrical.

12. The valve of claim 7, wherein the bearing surfaces perpendicularly intersect.

13. The valve of claim 1, wherein at least one of the stems extends externally of the valve housing.

14. The valve of claim 1, wherein both stems extend externally of the housing so that either stem can be used to open and close the valve.

15. The Valve of claim 1, wherein each stem is surrounded by bearings forming an interface between each stem and the housing.

16. The valve of claim 15, wherein the bearings are trunnions.

17. The valve of claim 15, wherein the bearings are roller bearings.

18. The valve of claim 1, further comprising a flexible annual seal at the interface of the ball valving member and the valve body on the upstream side of the ball valving member for preventing the travel of particular matter from the flow bore to the stems.

* * * * *